June 4, 1963 L. J. JAVORIK 3,092,692

MAGNETIC TRANSCRIBER

Filed July 13, 1959 3 Sheets-Sheet 1

INVENTOR
Laszlo J. Javorik

BY Francis W. Crotty
ATTORNEY

June 4, 1963 L. J. JAVORIK 3,092,692

MAGNETIC TRANSCRIBER

Filed July 13, 1959 3 Sheets-Sheet 2

INVENTOR
Laszlo J. Javorik
BY Francis W. Crotty
ATTORNEY

June 4, 1963 L. J. JAVORIK 3,092,692

MAGNETIC TRANSCRIBER

Filed July 13, 1959 3 Sheets-Sheet 3

INVENTOR
Laszlo J. Javorik
BY Francis W. Crotty
ATTORNEY

United States Patent Office 3,092,692

Patented June 4, 1963

3,092,692

MAGNETIC TRANSCRIBER

Laszlo J. Javorik, Chicago, Ill., assignor to Zenith Radio Corporation, a corporation of Delaware Filed July 13, 1959, Ser. No. 826,838

11 Claims. (Cl. 179—100.2)

This invention relates in general to magnetic transcribers and in particular to a magnetic head construction and a method for recording more than one channel of information upon a single track of a magnetizable medium.

In the magnetic recording art, it is known to superimpose two different channels of information upon the same area of a magnetizable medium in order to effect a conservation of the medium. For example, it has been proposed to position a magnetic recording head with its non-magnetic gap at a 45° angle to the longitudinal axis of a magnetizable tape during an initial recording. The head is then re-oriented to a second position in which the gap is displaced from its original position by an angle of 90°; the second recording is then superimposed directly upon the first. This arrangement, of course, requires a positioning mechanism for orienting the magnetic head to the desired operating position and since the selectivity of the head during playback is dependent upon the exactness with which the gap is realigned to the position it occupied during the recording, a relatively precise positioning mechanism is required.

Alternatively, a pair of magnetic heads may be spaced along the longitudinal axis of the tape in tandem with their respective gaps angularly offset by 90° and simultaneously energized to record two channels on the tape. These channels may constitute unrelated information or the related channels of a stereo program. While an obvious limitation of this system is the necessity of having duplicate magnetic heads, the magnetic flux leakages from the spaced heads pose additional difficulties. More particularly, where two unrelated programs have been recorded and it is desired to reproduce one of them, a cross talk component attributable to the other recording is detected. On the other hand, in stereo applications, this deficiency is manifest in an undesirable echo effect in the channel associated with the trailing head.

It is also known in the preparation of coded tapes to rotate or oscillate the magnetic head of the transcriber, while the tape is moving relative thereto, in order that the angular orientation of the magnetic flux pattern may shift continuously or in accordance with some coding schedule along the tape. Such prior art devices, while accomplishing a desired measure of secrecy, suffer a loss in sensitivity due to the rotation of the non-magnetic gap. A condition of minimum sensitivity is established each time the gap becomes aligned with the axis of the tape. A suggested solution to this problem is to employ a driving mechanism having a logarithmic spiral such that the head is momentarily accelerated as the gap approaches parallelism with the tape axis. This expedient however, while useful in some applications, is not suitable for transcriptions of music or other intelligence demanding high fidelity reproduction.

There is the additional limitation in prior art rotating head arrangements that the frequency response of the head is constantly changing as well as the sensitivity. This obtains in view of the fact that a magnetic head having a given gap width provides optimum high frequency response when it is disposed perpendicular to the direction in which the magnetic tape is moving. Optimum low frequency response, on the other hand, is achieved as the effective width of the gap is increased and such increase is experienced as the gap assumes a position in which it is parallel to the tape axis. It would be well to note at this juncture that the term width designates that dimension of the gap which defines the distance between confronting pole pieces. The length of the gap, obviously, is the dimension normal to the width.

While some economy of the magnetizable medium has been realized with prior art devices, it has been secured in one instance by employing a precise head positioning mechanism and in another by doubling the number of magnetic heads required for the transcription.

It is therefore an object of the invention to provide a novel magnetic head construction for superposing a pair of discrete channels of information upon a single track of a magnetizable medium.

It is a more specific object of the invention to provide a unitary magnetic head construction for use in such plural recording.

It is also an object of the invention to provide a novel method for superimposing a plurality of channels upon a single track of a magnetizable medium.

It is also an object of the invention to provide a magnetic head construction and recording technique for effecting a heretofore unrealizable economy of the magnetizable medium.

It is still a further object of the invention to provide a magnetic head construction for use in plural recording techniques in which crosstalk and echo effects are substantially attenuated.

A magnetic transcriber constructed in accordance with the invention includes a magnetizable medium and a magnetic transcribing head comprising a plurality of magnetic structures defining a series of asymmetrical non-magnetic gaps which are positioned in transcribing registration with respect to the medium. At least one signal translating coil is individually associated in inductive coupling relation with each of the structures. Means are provided for interconnecting the coils in accordance with the first pattern of connections such that an excitation signal applied to the coils develops magnetic flux fields of predetermined relative polarities across the gaps. Means are also provided for interconnecting the coils in accordance with a second pattern of connections such that an excitation signal applied thereto develops magnetic flux fields of different predetermined relative polarities across the gaps. The transcriber also includes a signal amplifier coupled to the coils for translating program signals as well as means for effecting relative movement between the medium and the transcribing head.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figures 1, 2:
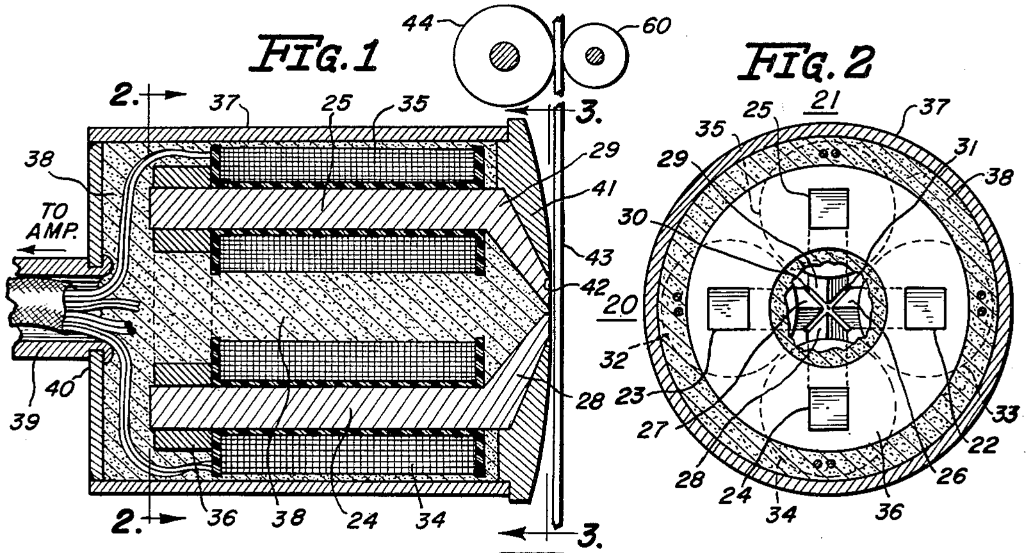
FIGURE 1 is a sectional view illustrating a magnetic transcribing head constructed in accordance with the invention.
FIGURE 2 is a cross sectional view taken along lines 2—2 of FIGURE 1.
Figure 8:
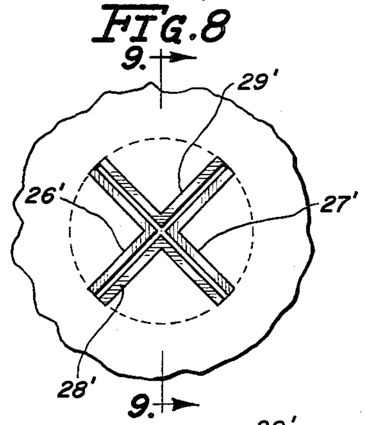
Figure 9:
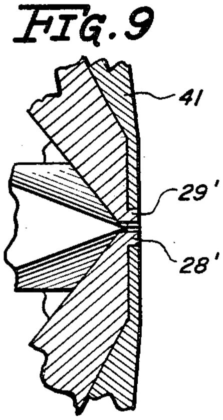
Figure 4:
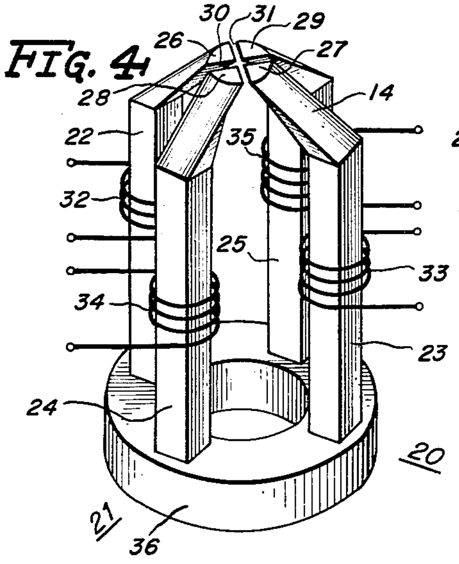
FIGURE 4 is a perspective view of the magnetic structures of the transcribing head of FIGURE 1.
Figure 7:
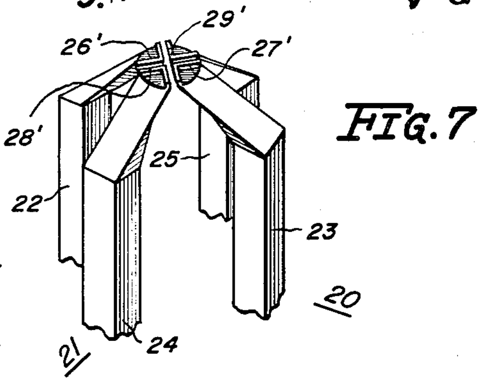
Figure 5:
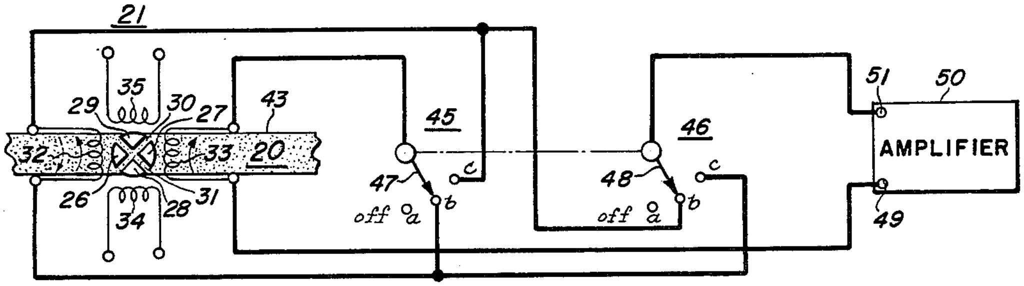
FIGURES 5 and 6 are schematic representations of switching arrangements for the magnetic head of FIGURE 1.
Figure 6:
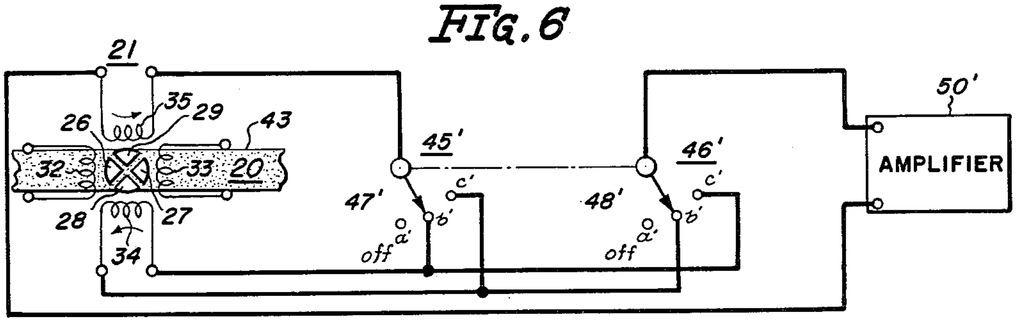
Figure 5A:
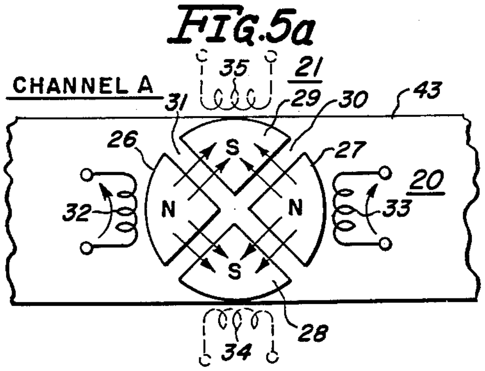
Figure 5B:
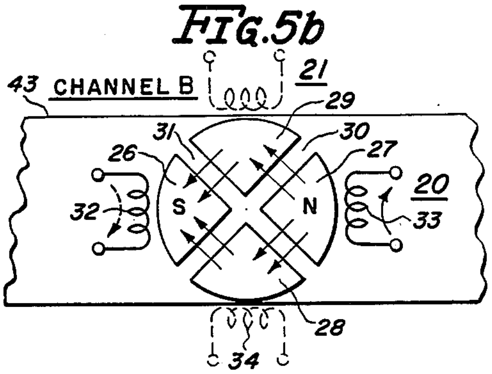
Figure 6A:
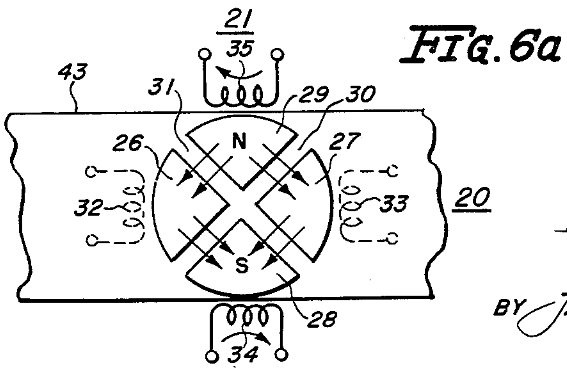
Figure 14:
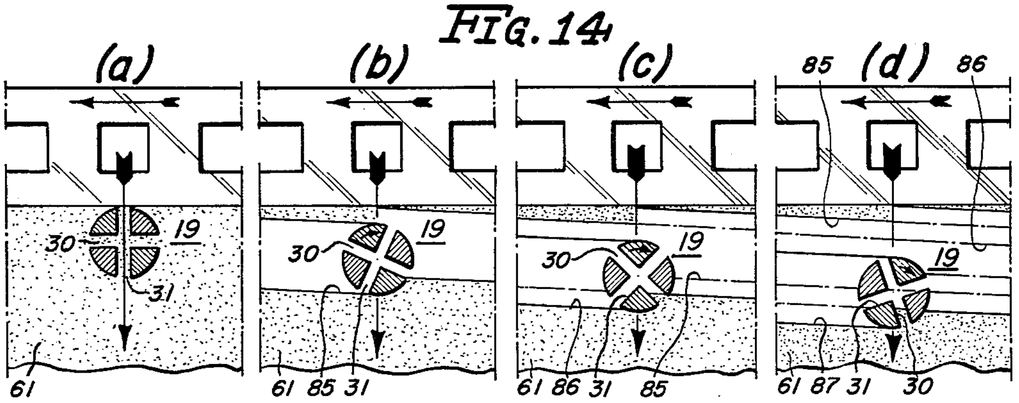
Figures 10, 11, 12, 13:
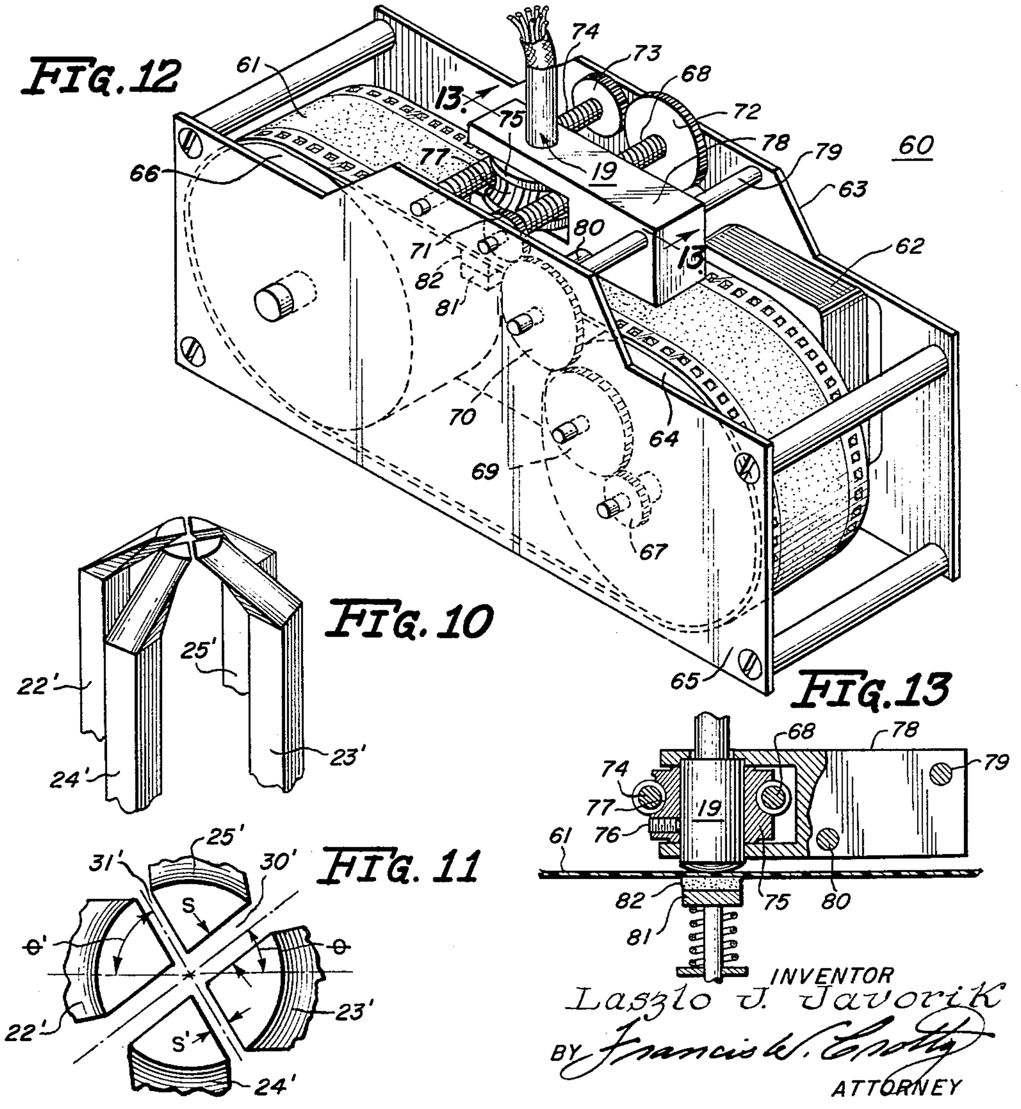

FIGURES 5*a*, 5*b* and 6*a* are explanatory diagrams of magnetic flux field configurations developed by the magnetic head of FIGURE 1;

FIGURE 7 is a fragmentary perspective view of an alternative pole face construction of the structure shown in FIGURE 4;

FIGURE 8 is an end view of a magnetic transcribing head employing the pole face construction of FIGURE 7;

FIGURE 9 is a fragmentary sectional view taken along lines 9—9 in FIGURE 8;

FIGURE 10 is a fragmentary perspective view of still another form of the pole piece construction;

FIGURE 11 is an end view of the pole face construction of FIGURE 10;

FIGURE 12 is a perspective view of a magnetic transcriber employing a magnetic head constructed in accordance with the invention;

FIGURE 13 is a fragmentary sectional view taken along lines 13—13 in FIGURE 12; and FIGURES 14(*a*)–(*d*) comprise a series of pictorial diagrams useful in explaining the operational characteristics of the transcriber of FIGURE 12.

The magnetic head assembly shown in FIGURES 1 and 2 comprises a pair of similar magnetic structures 20 and 21 arranged in mutually perpendicular relation. The first such structure 20 has paired diametrically opposed pole pieces 22, 23 and the other has opposed pole pieces 24, 25. The two pairs of pole pieces are of substantially identical configuration and have pole faces 26—29 tapering to a confronting relation in which they define a pair of intersecting non-magnetic gaps 30, 31 shown clearly in FIGURES 3 and 4. While the gaps, as shown, constitute an air dielectric it is recognized that the non-magnetic requirement for the gap may likewise be satisfied by inserting shims or spacers of non-magnetic material between confronting pole faces. The opposite ends of pole pieces 22—25 are mounted in an apertured member or ring 36 of magnetic material which serves as a base for magnetic structures 20, 21. The magnetic structures also include signal translating coils 32—35 positioned in encircling relation upon pole pieces 22—25, respectively, to be in inductive coupling relation therewith.

The magnetic head assembly further comprises a housing 37 which receives the magnetic structures and serves as a magnetic shield therefor. Magnetic structures 20, 21 are rigidly restrained within housing 37 by a resinous potting material 38. A sleeve 39 staked to a bottom plate 40 of housing 37 admits connector leads which couple coils 32—35 to signal amplifiers 50, 50', in the manner shown in the schematic diagrams of FIGURES 5 and 6, discussed more fully below. A cap 41 of non-magnetic material is secured to the opposite end of housing 37 and includes an aperture 42 disposed about pole faces 26—29 to expose them to the end that the pole faces may be positioned in transcribing registration with respect to a magnetizable medium such as a tape 43 coated with comminuted particles of paramagnetic material. Means are provided for effecting relative movement between the tape and the transcribing head, specifically a driving capstan 44 and a cooperating idler 60 which frictionally engage the tape.

In order to energize the magnetic structures and make a transcription there are means for interconnecting the signal-translating coils thereof in accordance with a first pattern of connections so that an applied excitation signal develops magnetic flux fields of predetermined relative polarities across gaps 30, 31 as well as means for interconnecting the coils in accordance with a second pattern of connections so that upon the application of an excitation signal flux fields of different predetermined relative polarities are developed across the gaps. More specifically, these connections may be established by a pair of switches 45, 46 having movable armatures 47, 48 ganged for simultaneous or unicontrolled action, and associated stationary contacts *a*—*c*, conveniently designated hereafter by reference numeral 45 or 46 with an appropriate suffix letter. As the armatures are displaced in respect of the stationary contacts, a variety of connections may be established from amplifier 50 to the coils 32 and 33 of the recording head. Armature 47 is permanently connected to the upper terminal of coil 33 while the lower terminal of that coil is returned to terminal 49 of amplifier 50; armature 48, on the other hand, is permanently connected to terminal 51 of amplifier 50. Contact **45*b* is connected to the lower terminal of coil 32 and to stationary contact 46*c* while contact 45*c* is connected to the upper terminal of coil 32 and to contact 46*b*. No contacts, for the case under consideration, extend to coils 34 and 35. With armatures 47 and 48 engaging contacts 45*b* and 46*b* as shown in FIGURE 5, the direction of current flow, illustrated by curved arrows, through each of coils 32, 33 is the same and the coils are established in series-aiding relation. Alternatively, series-opposing relation obtains when armatures 47, 48 are in engagement with contacts 45*c* and 46*c***, respectively. The *a* contacts constitute "off" positions for both switches.

The operation of the invention is best understood by referring to the explanatory diagrams of FIGURES 5*a* and 5*b* in which only the pole faces 26—29 and the associated signal translating coils 32—35 of magnetic structures 20, 21 are depicted. This diagram assumes that the switches 45 and 46 have been adjusted to the positions of FIGURE 5. Upon energizing driving capstan 44, tape 43 is propelled across non-magnetic gaps 30, 31 and the recording of a first channel of information, designated channel A, is initiated under the influence of excitation signals supplied by amplifier 50 to induce current flow through coils 32, 33 in series-aiding relation. This current develops magnetic lines of force across gaps 30, 31 which may be represented, at a particular instant, by the field configuration or polarities indicated in FIGURE 5*a*. This field configuration obtains because the currents through coils 32, 33 establish both pole faces 26, 27 as magnetic north poles while pole faces 28, 29, which return the magnetic flux to base member 30 at the opposite end of the magnetic structure, constitute magnetic south poles. Note that the phase of the magnetic field components across opposite ends of each of the gaps 30 and 31 are 180° out of phase. The time variations of the magnetic field correspond to the program information and, as the tape is drawn past the gaps of the magnetic head, that program is recorded in what may be referred to as mode 1 or mode A.

Upon the completion of this recording, a second program may be superimposed upon the same portion of tape 43 by simply altering the pattern in which coils 32, 33 are interconnected with amplifier 50. Specifically, armatures 47, 48 are rotated to engage stationary contacts **45*c*, 46*c*, respectively. Tape 43 is again set in motion and channel B excitation signals are supplied by amplifier 50 to energize coils 32, 33. Observe, the upper terminal of coil 33 is now connected through switch 45 to the upper terminal of coil 32 to establish the coils in series-opposing relation in which current from amplifier 50 flows through coil 32 in a direction opposite to that through coil 33, as shown by a curved broken line. As a result pole face 27 is established as a magnetic north pole, as previously explained; pole face 26, however, is established as a magnetic south pole since the current flows through coil 32 in the opposite direction. Pole faces 28, 29, in this instance comprise a low reluctance magnetic path between pole faces 26, 27. The magnetic lines of force developed across gaps 30, 31** in response to this current are represented in FIGURE 5*b*. They constitute magnetic flux fields that have different relative polarities than those of FIGURE 5*a*; specifically, the components of the magnetic fields for this condition which may be referred to as mode 2 or mode B are in phase across the entire length of each gap. All the pole faces of magnetic structures 20, 21 are employed in effecting magnetic recordings in mode A and in mode B, even though only coils 32, 33 are energized by program signals.

The property of the described transcription which permits superimposing a pair of channels upon the same portion of a magnetic tape while at the same time permitting the separation or isolation of programs A and B may be more completely understood through a consideration of the playback operation.

To reproduce either program A or B, coils 32, 33 are electrically interconnected in the same pattern employed during the recording process. Assume first that coils 32, 33 have been connected in series-aiding relation and that the magnetic head is caused to scan the moving tape. Of course, the connection is now to the input circuit of amplifier 50 whereas, during recording, these coils are in the output circuit of the amplifier. The magnetic structures 20, 21 intercept the magnetic flux lines emanating from the tape and representing channel A information to induce currents in each coil. The currents flow in the same direction in each coil and cumulatively provide an input signal for amplifier 50 corresponding to program A. Concurrently the magnetic structures of the pick-up head cut the lines of force or magnetic flux field representing program B; however, in view of the manner in which the mode B record has been prepared the currents which this field induces in coil 32 are opposed to the currents which this same field induces in coil 33. Accordingly, so far as program B information is concerned, there is no effective current induced in the windings and applied to amplifier 50. Alternatively, when coils 32 and 33 are connected in a series-opposing relation, only channel B intelligence is reproduced since the currents induced in coil 32 by the magnetic field corresponding to program A, in this case, oppose and cancel the currents induced by the same field in coil 33, yielding no input for amplifier 50.

FIGURE 6 portrays switching means for interconnecting coils 34, 35 of magnetic structure 21, as distinguished from coils 32, 33, in order to effect mode A and mode B transcriptions. In this modification, however, the engagement of armatures 47′, 48′ with stationary contacts **45*b*′, 46*b*′, as shown in FIGURE 6, establish coils 34, 35** in series-opposing relation while interconnections completed through the *c*′ contacts determine a series-aiding relation of the coils.

The operation of magnetic structure 21 is substantially the same as described above. The magnetic field distribution for the pattern of connections shown in FIGURE 6 is illustrated in FIGURE 6*a* and is seen to correspond to the field distribution of FIGURE 5*b*. Both result from a series-opposing relation of the two effective coils of the transducer and both are characterized by flux field components that are in phase across the entire length of the gaps. Similarly, a field distribution like that of FIGURE 5*a* is obtained by connecting coils 34, 35 in a series-aiding relation.

A magnetic head or transducer of the type described is particularly useful for binaural transcriptions since a pair of discrete channels of information can be impressed upon the same area of a magnetic tape by selectively energizing the associated coils of magnetic structures 20, 21. A binaural recording may be made by completing electrical interconnections between coils 32, 33 with amplifier 50 and from coils 34, 35 to amplifier 50′. It is necessary, however, that one pair of coils be connected in a series-aiding relation and that the other pair be in series-opposition. When this precaution has been observed, one program signal is recorded in mode A and the companion program signal is concurrently recorded in mode B upon tape 43. It is apparent from well-known theorems of super-position that the magnetic record established on the tape is that resulting from the recording fields of FIGURES 5*a* and 6*a* modulated by the two program signals, recognizing that the program information of these signals is specifically different although intimately related as required to effect a binaural or stereophonic transcription.

In order to reproduce the stereo program both pair of coils in the transducer are connected to the input circuits of the amplifiers and the same series-aiding and series-opposing relation employed in making the recording is established again. When tape 43 is scanned, the magnetic flux components recorded in mode A and representing the first signal channel induce an effective signal voltage in only one of the coil pairs while the field components recorded in mode B and constituting the second signal channel induce an effective signal voltage only in the remaining coil pair for reasons previously described. In other words, the described coil pair arrangement in conjunction with the gaps 30 and 31 of the transducer make it possible to superpose two program recordings on the same track of the tape in such manner that they may be effectively isolated from one another in playing back the tape. Furthermore, by employing the intersecting gap construction echo effects between channels are substantially attenuated.

Referring now to another aspect of the magnetic transcribing apparatus, it is known that flux leakage from the area of the pole pieces of a transducer in registration with a magnetic tape has a direct bearing on the high frequency response of the device. An alternate construction of the pole pieces of the transducer, featuring control of the flux leakage in order to obtain a desirable high-frequency response, is disclosed in FIGURES 7–9. Specifically, the upper surfaces of pole pieces 22—25 are relieved to define pole faces 26′—29′ characterized as upstanding land portions peripherally disposed in a confronting relation adjacent intersecting gaps 30, 31. The cap 41 of non-magnetic material is then extended across the relieved portions of the pole pieces to abut against land portions 26′—29′. As a result, the area of the pole faces in registration with the magnetic tape is considerably reduced and the magnetic flux field distribution between pole faces 26′—29′ is concentrated as required to reduce flux leakage, improve frequency response and further enhance the utility of the transducer.

As thus far described, intersecting gaps 30 and 31 of the transducer are mutually perpendicular and are symmetrical with respect to the longitudinal axis of the tape. In this geometrical pattern, the axis of each gap is at 45 degrees with respect to the longitudinal axis of the tape. This is a reasonable compromise and angular orientation to achieve by way of each such gap transcription of high as well as low frequency components of the program information. It is known that the recording from any single gap may be made to favor high or low frequency components by varying the angular orientation over a range from zero to 90 degrees. For the particular pattern shown, as the angle defined by the gap and tape axis becomes less than 45 degrees, the transcription increasingly favors low frequency components and, alternatively, as that angle becomes larger than 45 degrees, the high frequency components are emphasized.

It is further understood that the frequency response characteristic of the transducer may be shaped or varied by modifying the gap dimension, specifically its width. The shorter the gap width, the better are the high frequency properties whereas larger gap widths provide better low frequency transcription. This feature as well as that of the preceding paragraph are put to advantage in the transducer embodiment of FIGURES 10 and 11.

As there illustrated, and with particular reference to FIGURE 11, pole pieces 22′ and 23′ are similar in configuration and pole pieces 24′ and 25′ are likewise similar to one another. The specific shapes of these pole pieces are chosen to the end that, when assembled in the geometrical pattern of FIGURE 11, they define two intersecting linear gaps 30′ and 31′ characterized by particular width dimensions and angular relation to the axis of the tape. More specifically, the width S of gap 30′ is now greater than that of gap 30 in the embodiment of FIGURES 1–4 whereas the width S′ of gap 31′ is less than that of gap 31 in the first described embodiment. Additionally, the angle $\theta$ defined by the axis of gap 30′ and the tape is less than 45 degrees while the angle $\theta'$ defined by gap 31′ and the axis of the tape exceeds 45 degrees. With this construction, high frequency components of a particular program are most efficiently and faithfully recorded through gap 31′ and the low frequency components of that program are efficiently and faithfully transcribed by gap 30′.

Figure 3:
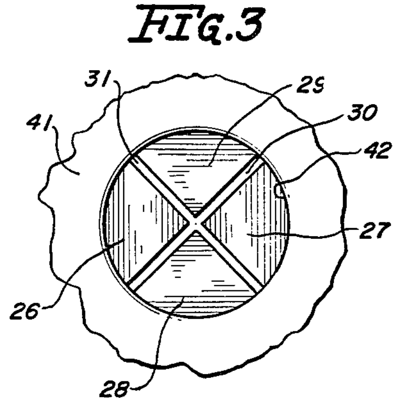
FIGURE 3 is a fragmentary end view taken along lines 3—3 in FIGURE 1.

While the above described embodiment contemplates a physical alteration of the shape of the pole pieces, it is recognized that the dimension of a particular gap can also be changed by repositioning adjacent pole pieces. For example if pole pieces 23, 24 of the transducer shown in FIGURE 3 are displaced in a direction parallel to the axis of gap 31, the width of gap 30 is increased thereby changing its response to favor the low frequency components.

The described transducers lend themselves particularly well to incorporation in a transcription device of simplified construction which may be used, for example, as a recording adjunct to a radio receiver. Such a device is represented in FIGURES 12 and 13 and features the use of an endless tape or belt which, in successive revolutions or passes of the tape, records a multiplicity of partially superposed tracks of the record. In order to facilitate playing back of such a record without crosstalk or interference in spite of the overlapping relation of successive tracks of the record, the recording head is rotated continuously but at a very slow angular rate during the recording process.

Specifically, the transcriber 60 employs a magnetizable medium comprising a 35 mm. endless perforated tape 61 having a coating, one inch in width, of magnetizable particles disposed upon at least one surface thereof and a magnetic head 19 having intersecting gaps approximately one-tenth of an inch wide. A driving mechanism for effecting relative movement between tape 61 and head 19 includes a motor 62 supported upon a wall 63 of the transcriber and coupled to a driving capstan 64 axially supported by the motor and by a wall 65. A plurality of sprocket teeth are peripherally arranged upon capstan 64 for supporting and cooperatively engaging perforated tape 61. An idler capstan 66 is axially supported between walls 63, 65 and comprises a second support for endless tape 61.

Driving capstan 64 includes an axially mounted pinion 67 which is mechanically coupled to a worm 68 rotatably supported by walls 63, 65 through a train including gears 69, 70 journalled in wall 65 and a pinion 71 secured to one end of worm 68. The other end of worm 68 mounts a pinion 72 which cooperatively engages a pinion 73 of reduced diameter which is fastened to one end of a second worm 74 disposed in a parallel spaced relation to worm 68, and, like worm 68, rotatably supported by walls 63, 65.

Referring now more particularly to FIGURE 13, the magnetic transcribing head 19 is shown secured within a holder 75 by a set screw 76. Holder 75 has a peripherally disposed concave surface 77 serrated for cooperative engagement with worms 68, 74 so that the head may be continuously rotated as the tape is driven by motor 62. A movable block 78 for supporting the holder is mounted for transverse movement with respect to tape 61 upon rods 79, 80 secured to walls 63, 65. Magnetic tape 61 is urged into registration with head 19 by a spring biased keeper 81 having a resilient non-abrasive portion 82 for engaging the tape.

The operation of transcriber 60 is best understood with reference to diagrams (*a*)—(*d*) of FIGURE 14 in which four phases of a recording operation are depicted. It is understood of course that the signal translating coils 32—35 of magnetic head 19, while not shown, are energized and develop magnetic flux fields in the manner described in connection with FIGURES *5a, 5b* or *6a*. Prior to discussing these diagrams, however, the mechanical operation of the transcriber will be briefly related. Motor 62 upon energization rotates capstan 64 at a predetermined speed which in turn drives tape 61 at the rate of thirteen revolutions per minute. Simultaneously, gear trains 67—71 drives worm 68 which, because of the disparity in the sizes of mating pinions 72, 73, concurrently drives worm 74 but at a higher speed. The relative speeds of worms 68 and 74 are chosen to impart two components of motion to head 19: (1) a rotation at the rate of 22.5 degrees for each revolution of the endless tape and (2) a displacement transversely of the tape in the amount of one-fourth the transverse dimension of the record track per revolution of the tape.

Now referring more particularly to FIGURE 14, diagram (*a*) illustrates the position of head 19 at the instant a recording is initiated. The intersecting gaps 30, 31 of the head are aligned with the cardinal axes of the tape. Diagram (*b*) shows the position of head 19 after one complete revolution of tape 61 and a track 85 representative of that portion of tape 61 upon which a signal has been recorded. The head has rotated 22.5 degrees during this first revolution of the tape and has also been displaced from its initial position a distance approximately one-fourth the width of track 85 in a direction normal to the longitudinal axis of the tape. FIGURE 14*c* depicts conditions at the completion of the second revolution of tape 61. The head has been rotated an additional 22.5 degrees and has been displaced another one-fourth of a track width transversely of the tape in superposing a second track 86 upon track 85. Diagram (*d*) shows head 19 at the end of three revolutions of the tape. At this time head 19 has been rotated 67.5 degrees from its initial position and a third track 87 has been recorded overlapping three-fourths of track 86.

Thus by employing a rotating head having a pair of intersecting gaps a recording comprising a continuous spiral of several overlapping convolutions can be disposed upon a magnetizable tape having a width of one inch. Prior art techniques provide a recording of much fewer tracks on a tape of the same width dimension through the use of a gap of similar length. With the described arrangement the superposed magnetic flux fields of each incremental area of the track are at all times displaced at least 22.5 degrees relative to one another. This results from the fact that the head is rotated 22.5 degrees and is displaced transversely of the tape in an amount equal to one-quarter of a track width in each pass or revolution of the tape. By the time the head has been rotated 45 degrees, assuming the orientation of FIGURE 14*a*, it has cleared the record portion previously transcribed with the head in that same aspect. Accordingly, cross talk or interference is minimized.

As explained previously, the angular orientation of the gap in the recording head affects the frequency response characteristic of the apparatus, favoring high frequency components when the gap is normal to the longitudinal axis of the tape and favoring low frequency components as the gap assumes a position parallel to that axis. Thus it will be appreciated that the frequency response will change somewhat as the head is rotated to assume the different aspects represented in FIGURES 14*a–d*. For recording of music and such program material, the dimensions of the gap, especially their width dimension, may be chosen to the end that the variation in frequency response has no perceptible adverse effect on the recording.

It may also be shown that the sensitivity of the device varies with angular orientation of the pick-up head since, with respect to any particular gap, sensitivity is a maximum when the gap is transverse of the tape and is a minimum when the gap is disposed along the axis of the tape. In the case at hand, featuring two gaps that are mutually perpendicular, the net sensitivity is the algebraic sum of the contribution of each and therefore the device in question is characterized as having a substantially constant sensitivity.

In utilizing the disclosed magnetic head construction in a rotating head system, the limitations inherent in prior art rotating head systems are eliminated and furthermore a substantial economy of the magnetic tape is effected. Moreover, by selectively energizing coils 32—35 of the head, transcriber 60 can be employed for recording successive superimposed channels upon the same portion of the spiral track or, alternatively, for recording a binaural program.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A magnetic transcriber comprising: a magnetizable medium; a magnetic transcribing head having a plurality of magnetic structures defining a series of asymmetrical non-magnetic gaps positioned in transcribing registration with respect to said medium; at least one signal translating coil associated in inductive-coupling relation with each of said structures; means for interconnecting said coils in accordance with a first pattern of connections such that an excitation signal applied thereto develops magnetic flux fields of predetermined relative polarities across said gaps; means for interconnecting said coils in accordance with a second pattern of connections such that an excitation signal applied thereto develops magnetic flux fields of different predetermined relative polarities across said gaps; a signal amplifier coupled to said coils for translating program signals; and means for effecting relative movement between said medium and said transcribing head.

2. A magnetic transcriber comprising: a magnetizable medium; a magnetic transcribing head comprising a pair of magnetic structures each having spaced pole pieces and conjointly defining a plurality of asymmetrical non-magnetic gaps positioned in transcribing registration with respect to said medium; at least one signal translating coil individually associated in inductive coupling relation with each of said pole pieces; means for interconnecting said coils in accordance with a first pattern of connections such that an excitation signal applied thereto develops magnetic flux fields of predetermined relative polarities across said gaps; means for interconnecting said coils in accordance with a second pattern of connections such that an excitation signal applied thereto develops magnetic flux fields of different predetermined polarities across said gaps; a signal amplifier coupled to said coils for translating program signals; and means for effecting relative movement of said medium and said transcribing head.

3. A magnetic transcriber comprising: a magnetizable medium; at least one pair of magnetic structures each having a pair of spaced oppositely disposed asymmetrical pole pieces and conjointly defining a plurality of intersecting non-magnetic gaps of equal widths positioned in transcribing registration with respect to said medium; a plurality of signal translating coils individually associated in inductive coupling relation with assigned ones of said pole pieces; means for interconnecting said coils of oppositely disposed ones of said pole pieces in accordance with a first pattern of connections such that an excitation signal applied thereto develops magnetic flux fields of predetermined relative polarities across said intersecting gaps; means for interconnecting said coils of oppositely disposed ones of said pole pieces in accordance with a second pattern of connections such that an excitation signal applied thereto develops magnetic flux fields of different predetermined relative polarities across said intersecting gaps; a signal amplifier coupled to said coils for translating program signals; and means for effecting relative movement of said medium and said transcribing heads.

4. A magnetic transcriber comprising: a magnetizable medium; a magnetic transcribing head including a plurality of magnetic structures individually having spaced oppositely disposed asymmetrical pole pieces and conjointly defining a pair of non-magnetic gaps of different widths intersecting at an angle less than ninety degrees and positioned in transcribing registration with respect to said medium with both of said gaps disposed across the longitudinal axis thereof; at least one signal translating coil associated in inductive coupling relation with each pole piece of at least one of said structures; means for interconnecting said coils of oppositely disposed ones of said pole pieces in accordance with a first pattern of connections such that an excitation signal applied thereto develops magnetic flux fields of predetermined relative polarities across said intersecting gaps; means for interconnecting said coils of oppositely disposed ones of said pole pieces in accordance with a second pattern of connections such that an excitation signal applied thereto develops magnetic flux fields of different relative polarities across said gaps; a signal amplifier coupled to said coils for translating program signals; and means for effecting relative movement between said medium and said transcribing heads.

5. A magnetic transcriber comprising: a magnetizable medium; a magnetic transcribing head including a pair of magnetic structures each having a pair of spaced oppositely disposed pole pieces and conjointly defining a pair of intersecting non-magnetic gaps positioned in transcribing registration with respect to said medium; a signal translating coil associated in inductive coupling relation with each pole piece of said structures; means for interconnecting said coils of oppositely disposed ones of said pole pieces in accordance with a first pattern of connections such that an excitation signal applied thereto develops magnetic flux fields of predetermined relative polarities simultaneously across both said intersecting gaps; means for interconnecting said coils of oppositely disposed ones of said pole pieces in accordance with a second pattern of connections such that an excitation signal applied thereto develops magnetic flux fields of different predetermined relative polarities simultaneously across both said intersecting gaps; a signal amplifier coupled to said coils for translating program signals; and means for concurrently effecting relative movement of said medium and said head in at least two different directions.

6. A magnetic transcriber comprising: an endless magnetizable medium; a magnetic transcribing head including a pair of magnetic structures each having a pair of spaced oppositely disposed pole pieces and conjointly defining a pair of intersecting non-magnetic gaps positioned in transcribing registration with respect to said medium; a signal translating coil associated in inductive coupling relation with each pole piece of said structures; means for interconnecting said coils of oppositely disposed ones of said pole pieces in accordance with a first pattern of connections such that an excitation signal applied thereto develops magnetic flux fields of predetermined relative polarities simultaneously across both said intersecting gaps; means for interconnecting said coils of oppositely disposed ones of said pole pieces in accordance with a second pattern of connections such that an excitation signal applied thereto develops magnetic flux fields of different predetermined relative polarities simultaneously across both said intersecting gaps; a signal amplifier coupled to said coils for translating program signals; and means for effecting relative movement of said medium and said head along the longitudinal axis of said medium and for concurrently rotating said head about its own axis.

7. A magnetic transcriber comprising: an endless magnetizable medium; a magnetic transcribing head including a pair of magnetic structures defining a pair of intersecting non-magnetic gaps positioned in transcribing registration with respect to said medium; a signal translating coil associated in inductive coupling relation with each of said structures; means for interconnecting said coils in accordance with a first pattern of connections such that an excitation signal applied thereto develops magnetic flux fields of predetermined relative polarities simultaneously across both said intersecting gaps; means for interconnecting said coils in accordance with a second pattern of connections such that an excitation signal applied thereto develops magnetic flux fields of different predetermined relative polarities simultaneously across both said intersecting gaps; a signal amplifier coupled to said coils for translating program signals; and means for effecting relative movement of said medium and said head along the longitudinal axis of said medium as well as transversely of said longitudinal axis and for concurrently rotating said head about its own axis.

8. A magnetic transcriber comprising: an endless magnetizable medium; a magnetic transcribing head comprising a pair of magnetic structures defining a pair of intersecting non-magnetic gaps positioned in transcribing registration with respect to said medium; a signal translating coil associated in inductive coupling relation with each of said structures; means for interconnecting said coils in accordance with a first pattern of connections such that an excitation signal applied thereto develops magnetic flux fields of predetermined relative polarities simultaneously across both said gaps; means for interconnecting said coils in accordance with a second pattern of connections such that an excitation signal applied thereto develops magnetic flux fields of different predetermined relative polarities simultaneously across both said gaps; a signal amplifier coupled to said coils for translating program signals; means for driving said medium past said head; means for rotating said head a preselected number of degrees for each revolution of said medium; and means for displacing said head a preselected fraction of the width of a record track in each revolution of said medium.

9. A magnetic transcriber comprising: an endless magnetizable tape; a magnetic transcribing head comprising a pair of magnetic structures defining a pair of intersecting non-magnetic gaps positioned in transcribing registration with respect to said tape; a signal translating coil associated in inductive coupling relation with each of said structures; means for interconnecting said coils in accordance with a first pattern of connections such that an excitation signal applied thereto develops magnetic flux fields of predetermined relative polarities simultaneously across both said gaps; means for interconnecting said coils in accordance with a second pattern of connections such that an excitation signal applied thereto develops magnetic flux fields of different predetermined relative polarities simultaneously across both said gaps; a signal amplifier coupled to said coils for translating program signals; means for driving said tape past said head; means for continuously rotating said head a preselected number of degrees for each revolution of said tape; and means for continuously displacing said head a preselected fraction of the width of a record track in each revolution of the tape.

10. A magnetic transcriber comprising: an endless magnetizable tape; a magnetic transcribing head comprising a pair of magnetic structures defining a pair of intersecting non-magnetic gaps positioned in transcribing registration with respect to said tape; a signal translating coil associated in inductive coupling relation with each of said structures; means for interconnecting said coils in accordance with a first pattern of connections such that an excitation signal applied thereto develops magnetic flux fields of predetermined relative polarities simultaneously across both said gaps; means for interconnecting said coils in accordance with a second pattern of connections such that an excitation signal applied thereto develops magnetic flux fields of different predetermined relative polarities simultaneously across both said gaps; a signal amplifier coupled to said coils for translating program signals; means for driving said tape past said medium; means for rotating said head approximately 22.5 degrees in each revolution of said tape; and means for displacing said head approximately one-fourth the width of a record track in each revolution of said tape.

11. The method of making a magnetic recording upon a medium with a multi-coil transducer having a pair of intersecting non-magnetic gaps and an associated switching network for connecting said coils to cause said transducer to produce magnetic flux fields of predetermined relative polarities, which method comprises the following steps: effecting relative movement between said transducer and said medium to scan a particular track of said medium; actuating said switching network to connect said coils in a predetermined configuration; applying a first continuous signal from a first signal source to said switching network to continuously develop simultaneously across each of said gaps during a scansion of said track a continuous magnetic flux field of a first predetermined relative polarity corresponding to said coil configuration and having strength variation with time representing a first continuous signal to effect a continuous magnetic recording; actuating said switching network to connect said coils in another configuration; applying a second continuous signal different from said first from a second signal source to said switching network to continuously develop simultaneously across each of said gaps during a scansion of said track a continuous magnetic flux field having a different predetermined relative polarity across each of said gaps and having strength variations with time representing a second continuous signal upon said track continuously overlying and superposed upon said continuous first signal recording.

References Cited in the file of this patent

UNITED STATES PATENTS

| | | |
|---|---|---|
| 2,668,059 | Roberts | Feb. 2, 1954 |
| 2,668,878 | Munroe | Feb. 9, 1954 |
| 2,712,572 | Roberts | July 5, 1955 |
| 2,785,038 | Ferber | Mar. 12, 1957 |
| 2,832,839 | Muffly | Apr. 29, 1958 |
| 2,929,670 | Garrity | Mar. 22, 1960 |

FOREIGN PATENTS

| | | |
|---|---|---|
| 174,220 | Austria | Mar. 10, 1953 |
| 1,036,198 | France | Apr. 22, 1953 |
| 537,187 | Belgium | Oct. 7, 1955 |